United States Patent
Tokoro et al.

(10) Patent No.: US 10,780,521 B2
(45) Date of Patent: Sep. 22, 2020

(54) METAL COMPOSITE AND METAL JOINING METHOD

(71) Applicant: Honda Motor Co., Ltd., Tokyo (JP)

(72) Inventors: Yosuke Tokoro, Saitama (JP); Mitsuru Sayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 730 days.

(21) Appl. No.: 15/595,926

(22) Filed: May 15, 2017

(65) Prior Publication Data
US 2017/0334017 A1 Nov. 23, 2017

(30) Foreign Application Priority Data

May 17, 2016 (JP) ................................. 2016-099133

(51) Int. Cl.
*B23K 20/12* (2006.01)
*B23K 33/00* (2006.01)
(Continued)

(52) U.S. Cl.
CPC ........ *B23K 20/1265* (2013.01); *B23K 20/124* (2013.01); *B23K 20/129* (2013.01);
(Continued)

(58) Field of Classification Search
CPC .. B23K 20/1265; B23K 20/129; B23K 20/12; B23K 20/122; B23K 2101/06; B23K 33/006; B23K 33/008
See application file for complete search history.

(56) References Cited

U.S. PATENT DOCUMENTS 3,040,427 A 6/1962 Howell
3,897,623 A 8/1975 Tasaki et al.
(Continued)

FOREIGN PATENT DOCUMENTS

CN 101076427 11/2007
CN 101369688 2/2009
(Continued)

OTHER PUBLICATIONS

Office Action of China Counterpart Application, with English translation thereof, dated Aug. 19, 2019, pp. 1-15.
(Continued)

*Primary Examiner* — Jonathan P Masinick
(74) *Attorney, Agent, or Firm* — JCIPRNET (57) ABSTRACT

A metal composite and a metal joining method that are capable of suppressing an influence on joining strength of a friction stir welded section due to a tool hole formed when a tool is extracted, in the case in which two metals are joined through friction stir welding. In an overlapping section in an axial direction in which a first shaft and a second shaft overlap in the axial direction, an inscribed section in which the first shaft and the second shaft come in contact with each other and an non-inscribed section in which the first shaft and the second shaft do not come in contact with each other are formed. In the non-inscribed section, a plate thickness of the second shaft is decreased. Then, a starting point of a friction stir welded section is formed in the inscribed section, and an endpoint is formed in the non-inscribed section.

6 Claims, 5 Drawing Sheets

(51) Int. Cl.
  *B23K 101/00* (2006.01)
  *B23K 20/227* (2006.01)
  *B23K 101/06* (2006.01)
  *B23K 103/20* (2006.01)

(52) U.S. Cl.
  CPC ........ *B23K 20/2275* (2013.01); *B23K 33/006* (2013.01); *B23K 33/008* (2013.01); *B23K 2101/006* (2018.08); *B23K 2101/06* (2018.08); *B23K 2103/20* (2018.08)

(56) References Cited

U.S. PATENT DOCUMENTS

| | | | | |
|---|---|---|---|---|
| 7,430,888 | B2* | 10/2008 | Osame | B21C 23/085 |
| | | | | 72/256 |
| 8,281,977 | B2* | 10/2012 | Sato | B23K 20/1225 |
| | | | | 228/112.1 |
| 10,272,520 | B2* | 4/2019 | Schmicker | B23K 20/12 |
| 2006/0266797 | A1* | 11/2006 | Kainer | B23K 20/12 |
| | | | | 228/101 |
| 2010/0038408 | A1* | 2/2010 | Keshavan | B23K 20/1275 |
| | | | | 228/112.1 |
| 2017/0314713 | A1* | 11/2017 | Toussaint | B23K 20/122 |
| 2018/0001571 | A1* | 1/2018 | Lennon | B23K 20/12 |

FOREIGN PATENT DOCUMENTS

| | | |
|---|---|---|
| CN | 102209822 | 10/2011 |
| CN | 103028837 | 4/2013 |
| CN | 203973073 | 12/2014 |
| CN | 104994987 | 10/2015 |
| JP | 2003166037 | 6/2003 |
| JP | 2003-230969 | 8/2003 |
| JP | 2005-095951 | 4/2005 |
| JP | 2009-248167 | 10/2009 |
| JP | 2012-143812 | 8/2012 |

OTHER PUBLICATIONS

"Office Action of Japan Counterpart Application," dated Jan. 9, 2018, p. 1-p. 11, with English translation thereof, in which the listed references were cited.

"Office Action of China Counterpart Application," with English translation thereof, dated Feb. 19, 2019, p. 1-p. 16.

* cited by examiner

METAL COMPOSITE AND METAL JOINING METHOD

CROSS-REFERENCE TO RELATED APPLICATION

This application claims the priority benefit of Japan application serial no. 2016-099133, filed on May 17, 2016. The entirety of the above-mentioned patent application is hereby incorporated by reference herein and made a part of this specification.

BACKGROUND OF THE INVENTION

Field of the Invention

The present invention relates to a metal composite formed of two metal members through friction stir welding, and a metal joining method.

Description of Related Art

As a joining method of joining two metal members, so-called friction stir welding including softening and stirring base materials by moving both of metal members in a horizontal direction simultaneously with pressing the metal members from above with respect to a joint (an overlapping section) at which the metal members overlap while rotating a tool constituted by a pin (a probe) installed at a tip center portion and a columnar rotary body, which is referred to as a shoulder, and solid-phase bonding a joining interface section of both of the metal members is known (for example, see Japanese Unexamined Patent Application Publication No. 2005-95951 and Japanese Unexamined Patent Application Publication No. 2009-248167).

Incidentally, when a tool is moved in a horizontal direction (or a circumferential direction) while rotating, metal material (stirred material) softened and stirred by the tool is driven backward in a direction opposite to a moving direction of the tool. For this reason, at a starting point where the tool is inserted into a metal member, stirred material that is stirred at the starting point is compensated for, but on the other hand, at an endpoint whether the tool is removed from the metal material, since there is no stirred material at the endpoint, the stirred material is not compensated for. As a result, a concave section (a tool hole) inevitably occurs at the endpoint. If a tool hole occurs, since stress is concentrated at the vicinity of the tool hole when a load is applied to the member, the joining strength of a friction stir welded section is decreased. In particular, when trajectories of friction stir welded sections overlap each other, since the overlapping section becomes a rebuilt portion of an area that was initially recessed, there is insufficient material at the overlapping section, and thus, a tunnel-shaped defect (a cavity defect) may occur.

In order to prevent occurrence of cavity defects in the overlapping section, a friction stir welding method in which an indentation quantity of the tool in the overlapping section is increased to be larger than that in other areas that do not overlap when the tool is moved in a horizontal direction is known (for example, see Japanese Unexamined Patent Application Publication No. 2009-248167).

In addition, in order for stress concentrated at the tool hole not to be exerted on a joining centerline at which the load conditions are strict, a friction stir welding method in which the endpoint (the tool hole) at which the tool is extracted from the metal member is formed in a lateral direction deviating from the joining centerline is known (for example, Japanese Unexamined Patent Application Publication No. 2005-95951).

SUMMARY OF THE INVENTION

In the friction stir welding method disclosed in Japanese Unexamined Patent Application Publication No. 2005-95951, an angular variation when a moving direction of the tool is switched (a bending angle from the moving direction before variation) is 90° or more. In general, when the tool is moved in a predetermined direction, a region (an AS side) in which the moving direction and the rotating direction of the tool are the same and a region (an RS side) in which the moving direction and the rotating direction of the tool are different from each other are formed on both sides in the moving direction of the tool. A flow velocity of the material is large on the AS side, whereas a flow velocity of the material is small on the RS side.

Accordingly, the angular variation when the moving direction of the tool is switched is 90° or more, a change in flow of the material when the angular variation occurs increases excessively, and cavity defects are likely to occur.

Meanwhile, in the friction stir welding method disclosed in Japanese Unexamined Patent Application, First Publication No. 2009-248167, since the indentation quantity is increased, a cutting quantity in a metal member (a second metal) disposed under a softened and stirred metal member (a first metal) is increased. If the cutting quantity of the second metal is increased, when the hardness of the second metal is high, abrasion loss in the tool is increased. In addition, an amount of heat generated by the tool and the second metal increases, and thus, a decrease in joining strength may occur.

Here, in consideration of the problems in the related art, the present invention has an objective of providing a metal composite and a metal joining method in which an influence on the joining strength of a friction stir welded section, due to a tool hole formed when a tool is extracted, is able to be reduced to a minimum, in a case in which two metals are joined through friction stir welding.

In order to accomplish the above-mentioned purposes, a metal composite according to the present invention has a friction stir welded section (40FSW) in which a second metal (12) is friction stir-welded under a first metal (11), wherein the first metal (11) includes an inscribed section (41) inscribed in the second metal (12), and a non-inscribed section (42) separated from the second metal (12), and a starting point (43) of the friction stir welded section (40FSW) is formed in the inscribed section (41) and an endpoint (44) is formed in the non-inscribed section (42).

In the above-mentioned configuration, at the endpoint (44) of the friction stir welded section, the first metal (11) is formed at the non-inscribed section (42) separated from the second metal (12). For this reason, at the endpoint (44), the first metal (11) and the second metal (12) are not being friction stir-welded. That is, the endpoint (44) is not contributing to a joining strength of the friction stir welded section (40FSW) between the first metal (11) and the second metal (12). Accordingly, even when the endpoint (44) including a tool hole (44a) is removed, the joining strength of the friction stir welded section (40FSW) is maintained as it is. That is, in the metal composite according to the present invention, the tool hole (44a) can be removed (cut away) without exerting an influence on the joining strength of the friction stir welded section (40FSW).

In a second feature of the metal composite according to the present invention, both of the first metal (11) and the second metal (12) are formed in a cylindrical shape, and the friction stir welded section (40FSW) is formed in a circumferential direction of an outer circumferential surface of the first metal (11).

In the above-mentioned configuration, the first metal (11) having the cylindrical shape and the second metal (12) having the cylindrical shape are joined concentrically to form a metal composite having a cylindrical shape that is friction stir-welded in the circumferential direction of the first metal (11). In the metal composite having the cylindrical shape, the endpoint (44) of the friction stir welded section (40FSW) is not contributing to the joining strength. Accordingly, in the metal composite having the cylindrical shape, the tool hole (44a) can be cut away (removed) without exerting an influence on the joining strength of the friction stir welded section (40FSW). Accordingly, a portion or the entirety of the metal composite having the cylindrical shape can be appropriately applied as a metal member having a cylindrical shape to which strength and hardness are required, for example, a stator shaft or the like.

In a third feature of the metal composite according to the present invention, the friction stir welded section (40FSW) has a first linear section (40L1) extending from the starting point (43) along the outer circumferential surface of the first metal (11), and a second linear section (40L2) bent at a bending angle (6) of 45° or less in a direction away from the starting point (43) with respect to the first linear section (40L1) and reaching the endpoint (44) along the outer circumferential surface of the first metal (11).

In the above-mentioned configuration, the first linear section (40L1) related to the friction stir welded section (40FSW) extending from the starting point (43) becomes the second linear section (40L2) bent at a predetermined bending angle (6) of 45° or less in front of the endpoint (44) and reaching the endpoint (44). In this case, since an angular variation of a trajectory is equal to or smaller than 45°, that is, the angular variation is gentle, a change in material flow according to the angular variation of the trajectory is reduced, and cavity defects are less likely to occur in the friction stir welded section (40FSW) after the angular variation. In addition, since the friction stir welded section (40FSW) of a first lap and the subsequent friction stir welded section (40FSW) do not overlap each other, cavity defects similarly are less likely to occur.

In a fourth feature of the metal joining method according to the present invention, a plate thickness reduction section (12a) is formed at either the first metal (11) or the second metal (12) in the non-inscribed section (42).

In the above-mentioned configuration, a state in which the first metal (11) and the second metal (12) do not come in contact with each other (a separated state) can be formed by the plate thickness reduction section (12a). Accordingly, since the non-inscribed section (42) is a region in which the second metal (12) and the tool do not come in contact with each other, a state in which the joining strength of the friction stir welded section (40FSW) does not depend on the endpoint (44) can be formed.

In a fifth feature of the metal composite according to the present invention, the plate thickness reduction section (12a) is formed at the second metal (12).

In the above-mentioned configuration, the plate thickness reduction section (12a) is formed at the second metal (12) disposed under the first metal (11). As a result, since there is no need to vary a depth of the tool when the friction stir welding is performed, work can be easily performed.

In order to accomplish the above-mentioned purposes, the present invention provides a metal joining method of friction stir-welding an overlapping section (40) in which a first metal (11) and a second metal (12) overlap by inserting a tool (20) into the first metal (11) with respect to the overlapping section (40) while pressurizing and rotating the tool (20), and extracting the tool (20) from the first metal (11) after the tool (20) is moved in a predetermined tangential direction, the metal joining method including: forming a gap (d) between the first metal (11) and the second metal (12) in the overlapping section (40), inserting the tool (20) into the first metal (11) related to an inscribed section (41) in which the gap (d) is not formed; and extracting the tool (20) from the first metal (11) related to a non-inscribed section (42) in which the gap (d) is formed.

In the above-mentioned configuration, the first metal (11) and the second metal (12) according to the first feature can be appropriately friction stir-welded.

In a second feature of the metal joining method according to the present invention, the second metal (12) having a cylindrical shape is concentrically inserted inside the first metal (11) having a cylindrical shape, and the tool (20) is moved in a circumferential direction of the outer circumferential surface of the first metal (11).

In the above-mentioned configuration, the first metal (11) and the second metal (12) according to the second feature can be appropriately friction stir-welded.

In a third feature of the metal joining method according to the present invention, when the tool (20) is moved in the circumferential direction of the outer circumferential surface of the first metal (11), before extracting the tool (20), the motion of the tool (20) is bent at a bending angle (δ) of 45° or less in a direction away from a starting point (43) at which the tool (20) is inserted.

In the above-mentioned configuration, the first metal (11) and the second metal (12) according to the third feature can be appropriately friction stir-welded.

In a fourth feature of the metal joining method according to the present invention, a plate thickness of either the first metal (11) or the second metal (12) is partially reduced.

In the above-mentioned configuration, the first metal (11) and the second metal (12) according to the fourth feature can be appropriately friction stir-welded.

In a fifth feature of the metal joining method according to the present invention, the plate thickness of the second metal (12) is partially decreased.

In the above-mentioned configuration, the first metal (11) and the second metal (12) according to the fifth feature can be appropriately friction stir-welded.

In a sixth feature of the metal joining method according to the present invention, a portion or the entirety of the non-inscribed section (42) is removed from the first metal (11).

In the above-mentioned configuration, since the tool hole (44a) is removed, the joining strength of the friction stir welded section (40FSW) is appropriately maintained.

According to the metal composite (100) of the present invention, the tool hole (44a) can be removed (cut away) without exerting an influence on the joining strength of the friction stir welded section (40FSW) between the first metal (11) and the second metal (12).

According to another metal composite (200) of the present invention, the joining strength of the friction stir welded section (40FSW) does not depend on the tool hole (44a).

In addition, according to the metal joining method of the present invention, the first metal (11) and the second metal (12) can be appropriately friction stir-welded such that the joining strength of the friction stir welded section (40FSW) does not depend on the tool hole (44a).

DETAILED DESCRIPTION OF THE INVENTION

Hereinafter, an embodiment of the present invention will be described with reference to the accompanying drawings.

Figure 1A:
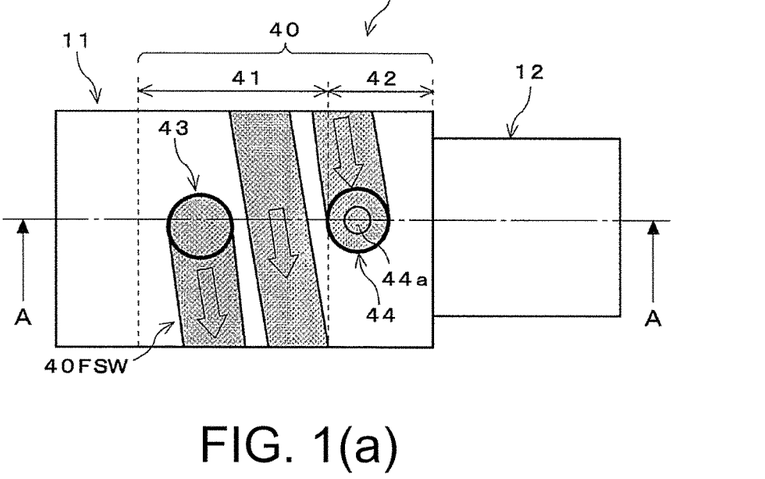
FIG. 1(a) to FIG. 1(c) is a view for describing a dissimilar metals shaftto which a friction stir welding method of the present invention is applied.
Figure 1B:
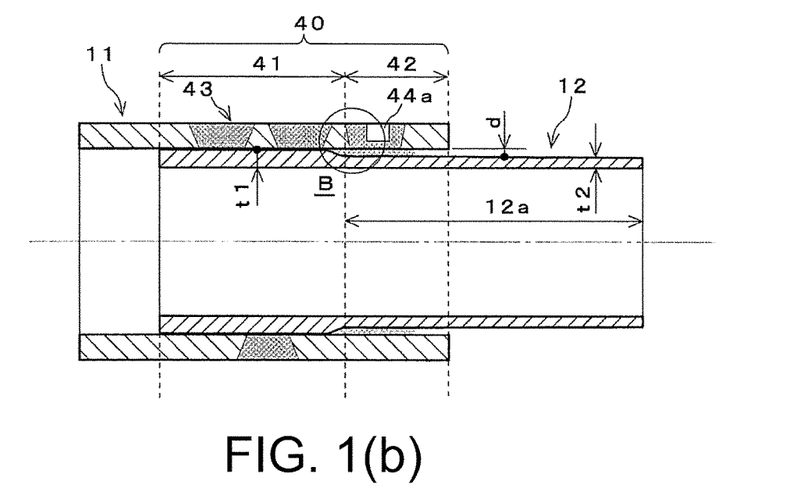
Figure 1C:
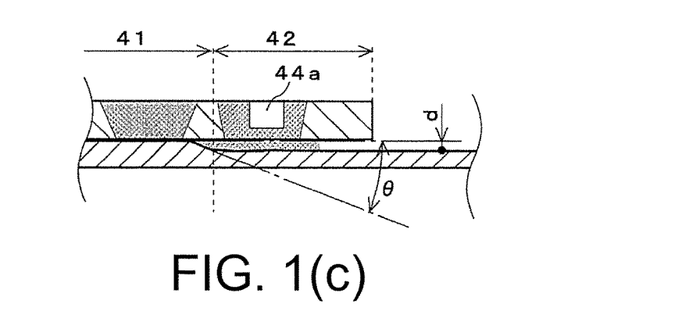

FIG. 1(a) to FIG. 1(c) is a view for describing a dissimilar metals shaft 100 to which a friction stir welding method of the present invention is applied. Further, FIG. 1(a) is a plan view of the dissimilar metals shaft 100 and FIG. 1(b) is a cross-sectional view taken along line A-A of FIG. 1(a). In addition, FIG. 1(c) is an enlarged view of a portion B of FIG. 1(b).

The dissimilar metals shaft 100 is constituted by a first shaft 11 and a second shaft 12 press-fitted to an inner circumferential surface of the first shaft 11. The first shaft 11 is a cylindrical hollow shaft formed of a light metal, for example, aluminum or an alloy thereof, as a whole. The second shaft 12 is a cylindrical hollow shaft formed of an iron-based metal, for example, stainless steel and in concentric with the first shaft 11.

As shown in FIG. 1(a), the first shaft 11 and the second shaft 12 are joined, for example, in a spiral shape over two laps through friction stir welding by pressing and rotating an axially overlapping section 40 in which an inner circumferential surface of the first shaft 11 and an outer circumferential surface of the second shaft 12 overlap in an axial direction using a friction stir welding tool 20 (hereinafter, referred to as "a tool") (FIG. 3). Accordingly, a friction stir welded section 40FSW configured to couple the first shaft 11 and the second shaft 12 is formed in a spiral shape at an outer circumferential surface of the first shaft 11.

In addition, as shown in FIG. 1(b), the axially overlapping section 40 is constituted by an inscribed section 41 in which the inner circumferential surface of the first shaft 11 comes in contact with the outer circumferential surface of the second shaft 12, and a non-inscribed section 42 in which the inner circumferential surface of the first shaft 11 does not come in contact with the outer circumferential surface of the second shaft 12. In addition, the second shaft 12 has a plate thickness reduction section 12a, and a plate thickness t2 of the non-inscribed section 42 is smaller than a plate thickness t1 of the inscribed section 41. For this reason, a gap d is formed between the first shaft 11 and the second shaft 12 in the non-inscribed section 42.

In the dissimilar metals shaft 100, a starting point (hereinafter, also simply referred to as "a starting point") 43 of the friction stir welded section 40FSW is formed in the inscribed section 41, and an endpoint (hereinafter, also simply referred to as "an endpoint") 44 of the friction stir welded section 40FSW is formed in the non-inscribed section 42.

Accordingly, the first shaft 11 and the second shaft 12 are not friction stir-welded in the non-inscribed section 42, and the gap d is filled with only a stirred member which is the first shaft 11 softened and stirred by the tool 20. The non-inscribed section 42 including the endpoint 44 is in a state in which the non-inscribed section 42 does not contribute to a joining strength of the friction stir welded section 40FSW. Accordingly, as will be described later with reference to FIG. 2(a) to FIG. 2(c) and FIG. 3(a) to FIG. 3(f), the non-inscribed section 42 of a tool hole 44a can be cut away from the first shaft 11.

In addition, as shown in FIG. 1(c), a boundary line between the inscribed section 41 and the non-inscribed section 42 has a step difference with an inclination θ (for example, 30° or less).

Figure 2A:
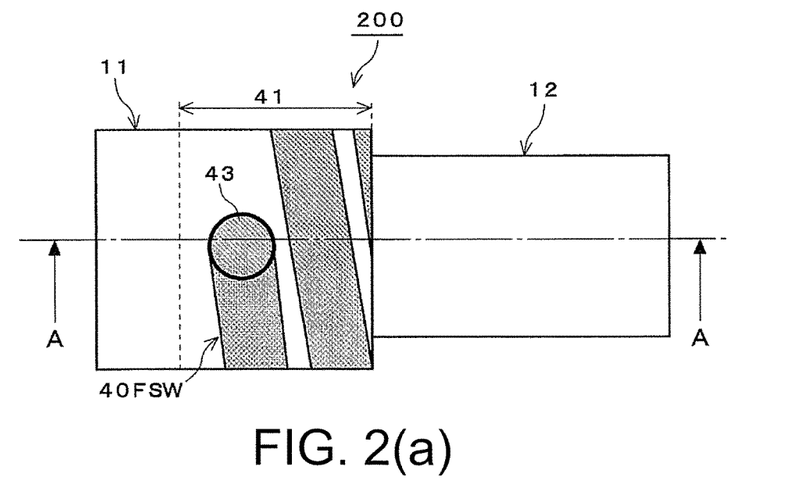
FIG. 2(a) to FIG. 2(c) is a view for describing another dissimilar metals shaft to which the friction stir welding method of the present invention is applied.
Figure 2B:
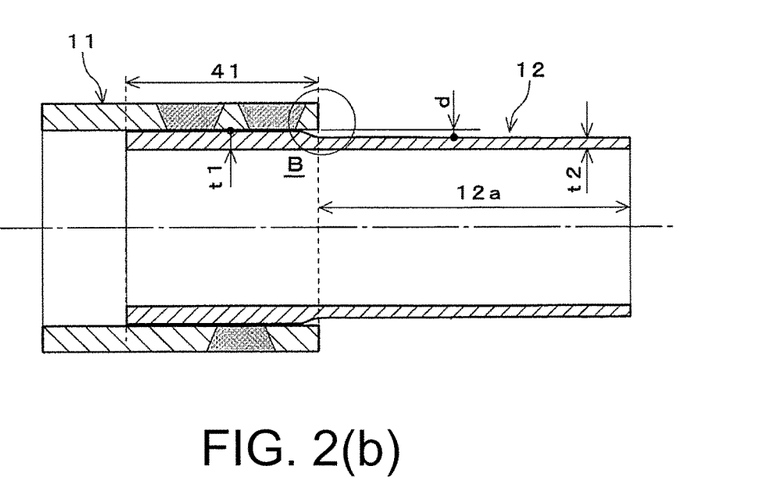
Figure 2C:
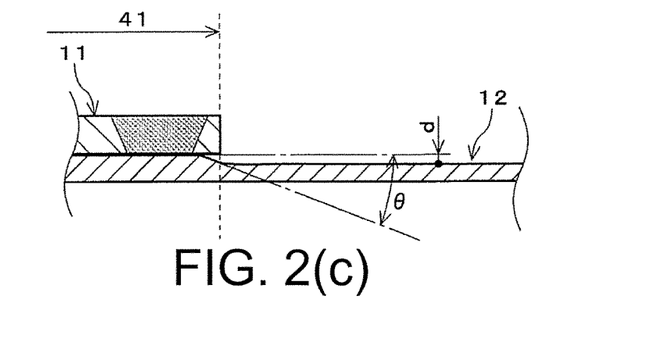

FIG. 2(a) to FIG. 2(c) is a view showing another dissimilar metals shaft 200 to which the friction stir welding method of the present invention is applied. Further, FIG. 2(a) is a plan view of the dissimilar metals shaft 200, and FIG. 2(b) is a cross-sectional view taken along line A-A of FIG. 2(a). In addition, FIG. 2(c) is an enlarged view of a portion B of FIG. 2(b).

The dissimilar metals shaft 200 corresponds to a member in which an area of the first shaft 11 related to the non-inscribed section 42 including the tool hole 44a is removed (cut away) from the dissimilar metals shaft 100. Accordingly, the endpoint 44 is not present in the friction stir welded section 40FSW formed at the outer circumferential surface of the first shaft 11. Since the friction stir welded section 40FSW related to the non-inscribed section 42 is not a section configured to join the first shaft 11 and the second shaft 12 through friction stir welding, even when the area is removed, the joining strength of the friction stir welded section 40FSW is not decreased. Hereinafter, the friction stir welding method of the present invention of manufacturing the dissimilar metals shaft 200 from the dissimilar metals shaft 100 will be described.

Figures 3A, 3D:
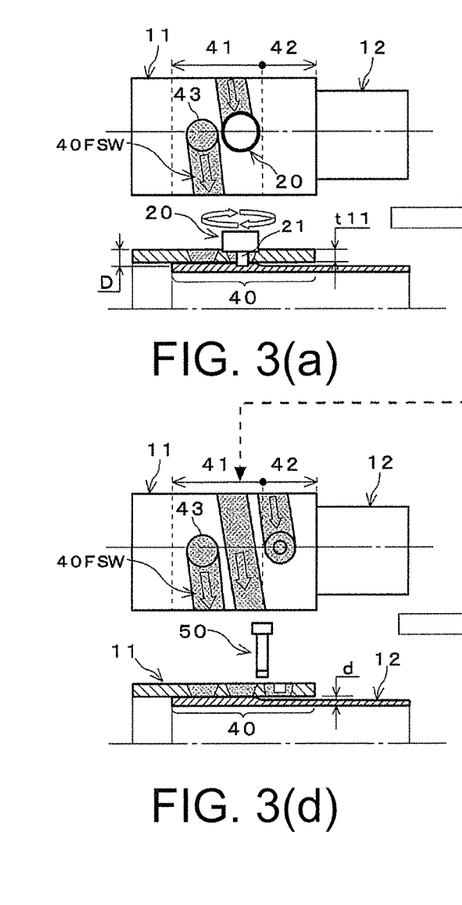
FIG. 3(a) to FIG. 3(f) is a view for describing the friction stir welding method of the present invention.
Figures 3B, 3E:
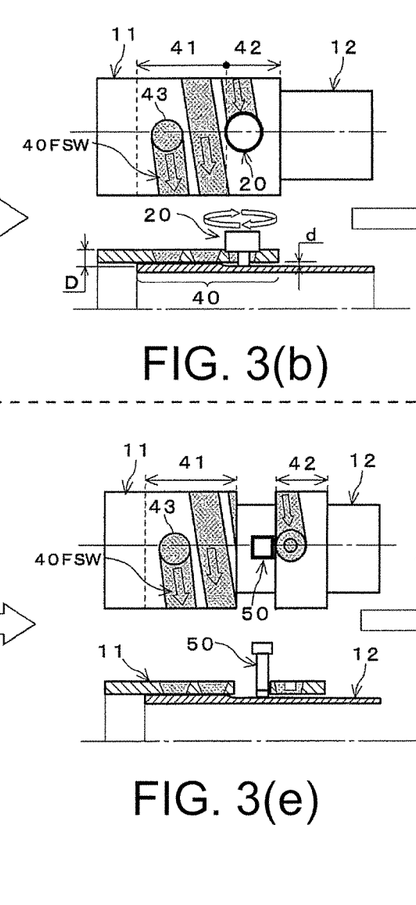
Figure 3C:
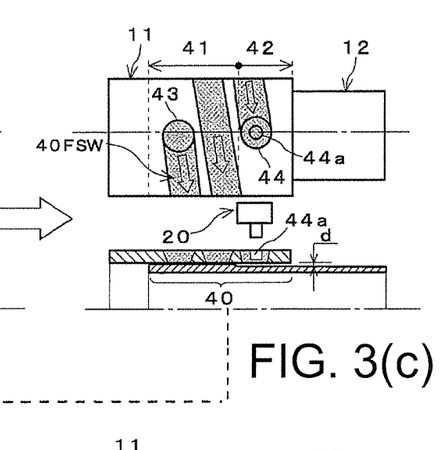
Figure 3F:
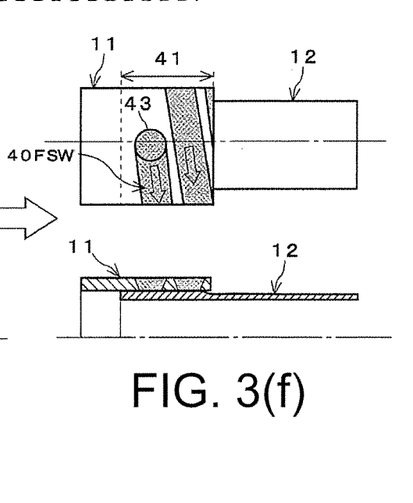

FIG. 3(a) to FIG. 3(f) is a view for describing the friction stir welding method of the present invention. Further, processes are presented in a plan view and a cross-sectional view. In addition, FIG. 3(a) to FIG. 3(c) show processes related to the dissimilar metals shaft 100 and FIG. 3(d) to FIG. 3(f) show processes related to the dissimilar metals shaft 200.

As shown in FIG. 3(a), the first shaft 11 is inserted into the axially overlapping section 40 in which the inner circumferential surface of the first shaft 11 and the outer circumferential surface of the second shaft 12 overlap in the axial direction while the tool 20 is pressurized and rotated, and the inscribed section 41 is moved in a spiral direction under predetermined joining conditions (a rotational speed and a tool moving speed of the tool 20) in a state in which an insertion depth D (a distance from the outer circumferential surface of the first shaft 11 to a pin tip 21 of the tool 20) is maintained. Further, in order to remove impurities (an oxide film) present between the first shaft 11 and the second shaft 12, the tool 20 grinds off the outer circumferential surface of the second shaft 12 to a predetermined depth K (=the insertion depth D—a plate thickness t11 of the first shaft).

As shown in FIG. 3(*b*), when the tool 20 moves on the non-inscribed section 42, an aluminum material softened and stirred by the tool 20 is filled into the gap d. In this case, the gap d (FIG. 1(*b*)) formed between the first shaft 11 and the second shaft 12 in the non-inscribed section 42 is set such that a depth (distance) thereof is equal to or larger than K. Accordingly, in the non-inscribed section 42, the tool 20 does not grind off the surface of the second shaft 12. As a result, the first shaft 11 and the second shaft 12 in the non-inscribed section 42 are in a state in which friction stir welding is not performed.

As shown in FIG. 3(*c*), when the tool 20 is extracted from the first shaft 11, the tool hole 44*a* is formed at the endpoint 44. The first shaft 11 and the second shaft 12 are not friction stir-welded at the endpoint 44. That is, the non-inscribed section 42 including the endpoint 44 is not contributing to the joining strength of the friction stir welded section 40FSW. Accordingly, the non-inscribed section 42 including the tool hole 44*a* is preferably removed (cut away).

The first shaft 11 and the second shaft 12 in the non-inscribed section 42 are in a state in which friction stir welding is not performed. Further, an aluminum material softened and stirred by the tool 20 is filled into the gap d. Accordingly, as shown in FIGS. 3(*d*) and 3(*e*), the non-inscribed section 42 including the tool hole 44*a* can be easily cut away from the first shaft 11 by a cut-off tool 50.

As shown in FIG. 3(*f*), as the non-inscribed section 42 is cut away from the first shaft 11, the dissimilar metals shaft 200 according to the present invention is obtained.

Figure 4:
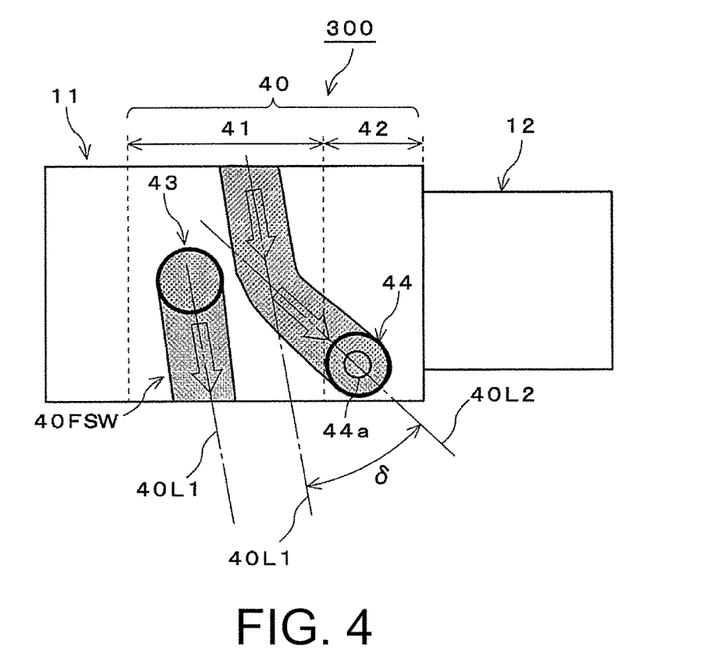
FIG. 4 is a view for describing a dissimilar metals shaft according to Variant 1 to which the friction stir welding method of the present invention is applied.

FIG. 4 is a view for describing a dissimilar metals shaft 300 according to Variant 1 to which the friction stir welding method of the present invention is applied.

In the dissimilar metals shaft 300, in order for the friction stir welded section 40FSW not to overlap, a moving direction (a tangential direction) of the tool 20 characterized by a first straight line 40L1 is bent at a bending angle δ in a direction away from the starting point 43 in front of the endpoint 44 and varied in the moving direction characterized by a second straight line 40L2. Further, the bending angle δ is defined as an angle formed between the first straight line 40L1 before variation and the second straight line 40L2 after variation, and an angle measured counterclockwise from the first straight line 40L1. Accordingly, the configuration is otherwise the same as in the above-mentioned dissimilar metals shaft 200.

Figure 5:
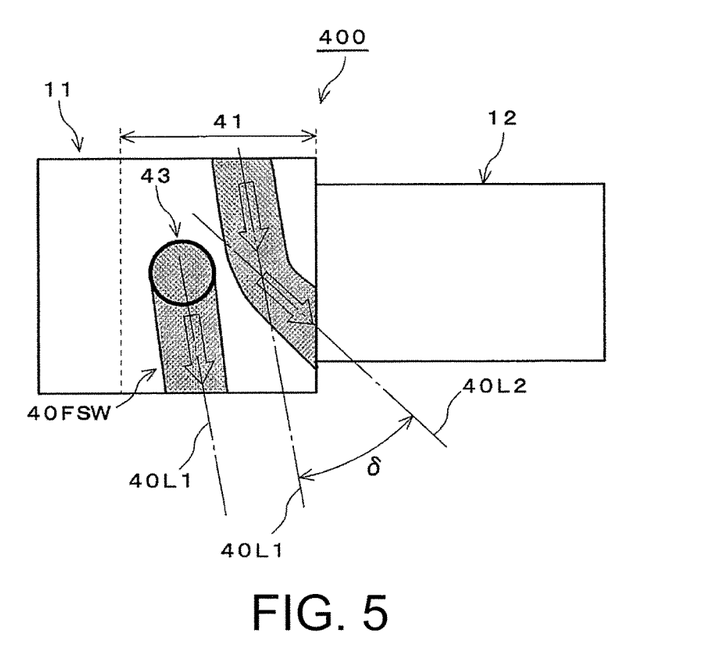
FIG. 5 is a view for describing a dissimilar metals shaft according to Variant 2 to which the friction stir welding method of the present invention is applied.

FIG. 5 is a view for describing a dissimilar metals shaft 400 according to Variant 2 to which the friction stir welding method of the present invention is applied.

The dissimilar metals shaft 400 is a shaft obtained by cutting the non-inscribed section 42 including the tool hole 44*a* away from the dissimilar metals shaft 300. Accordingly, the configuration is otherwise the same as in the dissimilar metals shaft 300.

Figure 6:
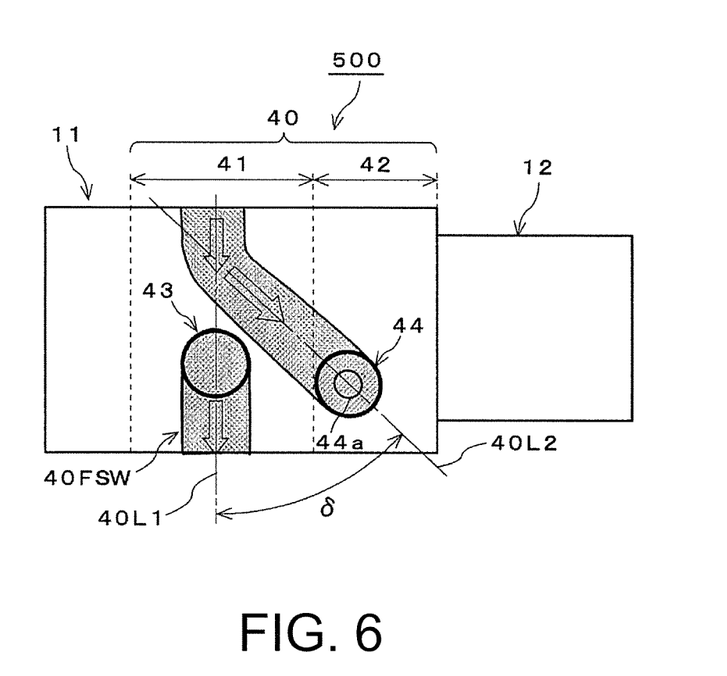
FIG. 6 is a view for describing a dissimilar metals shaft according to Variant 3 to which the friction stir welding method of the present invention is applied.

FIG. 6 is an explanatory view for describing a dissimilar metals shaft 500 according to Variant 3 to which the friction stir welding method of the present invention is applied.

Unlike the dissimilar metals shaft 300, in the dissimilar metals shaft 500, the friction stir welded section 40FSW is formed in the circumferential direction. Accordingly, the configuration is otherwise the same as in the dissimilar metals shaft 300. Accordingly, like the dissimilar metals shaft 300, in the dissimilar metals shaft 500, in order for the friction stir welded section 40FSW not to overlap, a moving direction (a tangential direction) of the tool 20 characterized by the first straight line 40L1 is bent at the bending angle δ in a direction away from the starting point 43 in front of the endpoint 44 and varied in the moving direction characterized by the second straight line 40L2.

Figure 7:
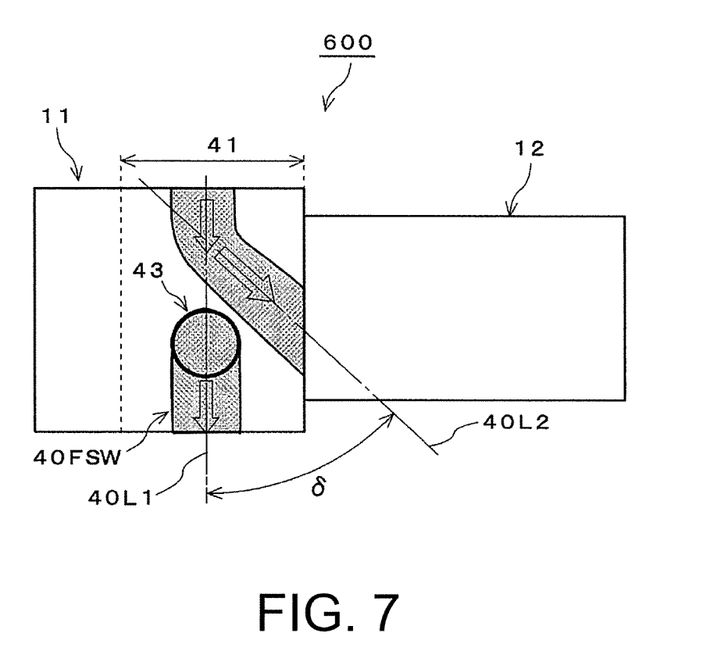
FIG. 7 is a view for describing a dissimilar metals shaft according to Variant 4 to which the friction stir welding method of the present invention is applied.

FIG. 7 is a view for describing a dissimilar metals shaft 600 according to Variant 4 to which the friction stir welding method of the present invention is applied.

The dissimilar metals shaft 600 is a shaft obtained by cutting the non-inscribed section 42 including the tool hole 44*a* away from the dissimilar metals shaft 500. Accordingly, the configuration is otherwise the same as in the dissimilar metals shaft 500.

Hereinabove, the dissimilar metals shaft and the metal joining method according to the embodiment have been described with reference to the accompanying drawings. However, the embodiment of the present invention is not limited to the above-mentioned embodiment and various modifications and alterations may be made without departing from the technical spirit of the present invention. For example, the first shaft 11 and the second shaft 12 may be formed of similar metals. In addition, in the moving direction of the tool 20 according to the friction stir welded section 40FSW, in addition to a spiral shape and a circumferential shape, a zigzag shape or a combination thereof may be used. Further, the number of laps of the tool 20 may be two or more.

What is claimed is:

1. A metal joining method of friction stir-welding an overlapping section in which a first metal and a second metal overlap by inserting a tool into the first metal with respect to the overlapping section while pressurizing and rotating the tool, and extracting the tool from the first metal after the tool is moved in a predetermined tangential direction, wherein the overlapping section has a contact section where the first metal and the second metal contact each other, and a non-contact section where a gap is formed between the first metal and the second metal, the metal joining method comprising:
    a process of friction stir-welding the first metal and the second metal by inserting the tool into the first metal at a position corresponding to the contact section, and extracting the tool from the first metal at a position corresponding to the non-contact section; and
    a process of removing the first metal at the position corresponding to the non-contact section comprising a tool hole from which the tool is extracted.

2. The metal joining method according to claim 1, wherein the non-contact portion is formed by making a plate thickness of the second metal smaller than that of the contact portion.

3. The metal joining method according to claim 2, wherein the second metal having a cylindrical shape is inserted inside the first metal having a cylindrical shape, and the tool is moved in a circumferential direction of an outer circumferential surface of the first metal.

4. The metal joining method according to claim 3, wherein, when the tool is moved in the circumferential direction of the outer circumferential surface of the first metal, before extracting the tool, the tool is bent at a bending angle of 45° or less in a direction moving away from a starting point at which the tool is inserted.

5. The metal joining method according to claim 1, wherein the second metal having a cylindrical shape is inserted inside the first metal having a cylindrical shape, and the tool is moved in a circumferential direction of an outer circumferential surface of the first metal.

6. The metal joining method according to claim 5, wherein, when the tool is moved in the circumferential direction of the outer circumferential surface of the first metal, before extracting the tool, the tool is bent at a bending angle of 45° or less in a direction moving away from a starting point at which the tool is inserted.

* * * * *